United States Patent
Wu et al.

(10) Patent No.: US 12,405,200 B2
(45) Date of Patent: Sep. 2, 2025

(54) AUTOMATIC MEASUREMENT SYSTEM FOR SLUDGE SETTLING VELOCITY

(71) Applicant: SHANGHAI SIPAI INTELLIGENT SYSTEMS CO., LTD., Shanghai (CN)

(72) Inventors: Jia Wu, Shanghai (CN); Taofang Pan, Shanghai (CN); Yan Shen, Shanghai (CN); Yijun Zhou, Shanghai (CN); Gang Qian, Shanghai (CN)

(73) Assignee: SHANGHAI SIPAI INTELLIGENT SYSTEMS CO., LTD. (CN)

( * ) Notice: Subject to any disclaimer, the term of this patent is extended or adjusted under 35 U.S.C. 154(b) by 560 days.

(21) Appl. No.: 17/783,663

(22) PCT Filed: May 19, 2020

(86) PCT No.: PCT/CN2020/090996
§ 371 (c)(1),
(2) Date: Jun. 9, 2022

(87) PCT Pub. No.: WO2021/212585
PCT Pub. Date: Oct. 28, 2021

(65) Prior Publication Data
US 2023/0047418 A1 Feb. 16, 2023

(30) Foreign Application Priority Data
Apr. 24, 2020 (CN) .......................... 202010331606.9

(51) Int. Cl.
*G01N 15/04* (2006.01)
*G01N 35/00* (2006.01)

(52) U.S. Cl.
CPC ......... *G01N 15/04* (2013.01); *G01N 35/0092* (2013.01)

(58) Field of Classification Search
CPC .... G01N 15/04; G01N 35/0092; Y02W 10/10
See application file for complete search history.

(56) References Cited

U.S. PATENT DOCUMENTS 6,811,706 B1 * 11/2004 Wahlberg ................ C02F 3/006
73/61.68

FOREIGN PATENT DOCUMENTS

CN 110702567 A * 1/2020

* cited by examiner

*Primary Examiner* — Tarun Sinha

(57) ABSTRACT

An automatic measurement system for Sludge settling Velocity comprises a sampling and shooting module, a data service module, a data processing module, and a measurement and analysis module. The sampling and shooting module is configured to collect samples and to obtain test images of samples. The data processing module is configured to collect and store process data. The measurement and analysis module is configured to obtain the sedimentation ratios of samples according to test images. The sludge activity is analyzed according to the sedimentation ratios. When the sludge activity is abnormal, the process data are obtained from data processing module, and the process analysis data are obtained according to the data and the sludge activity analysis results. The automatic measurement system can avoid errors caused by manual measurement and improve accuracy and efficiency of detection and can avoid the problems of untimely detection.

14 Claims, 6 Drawing Sheets

AUTOMATIC MEASUREMENT SYSTEM FOR SLUDGE SETTLING VELOCITY

TECHNICAL FIELD OF THE INVENTION

The present disclosure relates to the technical field of Sludge settling Velocity measurement, and more particularly, relates to an automatic measuring system for Sludge settling Velocity.

BACKGROUND OF THE INVENTION

Sludge settling velocity (or SV for short) is one of the important indicators to evaluate the characteristics of activated sludge. Sludge settling Velocity refers to the volume ratio of the sedimented sludge to the mud-water mixture after the aeration tank mud-water mixture is allowed to settle for a certain period (for example, 30 min) in a certain measuring cylinder (for example, 1000 mL). Operators can identify problems through the activated sludge settling process. For example, from the sudden change of Sludge settling Velocity value, the color of activated sludge and the floating situation after standing, both properties of sludge and conditions of aeration and oxygen supply can be known. Sludge settling Velocity can also intuitively reflect sludge concentration. Sludge settling Velocity can also indirectly reflect the load, which has a certain significance for adjusting the load and controlling the F value and the M value. SV30 refers to the percentage of the volume of sedimented sludge formed to the volume of the mixed solution taken from the aeration tank after standing in the graduated cylinder for 30 minutes, in the aerobic biological treatment of wastewater. The Sludge settling Velocity includes measured sludge settling velocity at different times in addition to SV30, for example SV5, SV30, SV120, etc. The results of Sludge settling Velocity measured at different times have different meanings. The SV value can reflect the amount of sludge and the cohesion and settling performance of the sludge during normal operation of the aeration tank. It is configured to control the adjustment of the discharge of excess sludge, etc., to ensure the stability of the process.

Sludge settling velocity is an important parameter in the operation process of the sewage treatment plant. The value of Sludge settling Velocity can reflect the amount of sludge and the cohesion and the settling performance of the sludge during normal operation of the aeration tank. In the prior art, Sludge settling Velocity is obtained by observing after manual sampling in the laboratory. However, the number of tests per day is limited, it is impossible to detect the sludge properties in time. From sampling to testing, the sludge is in a sealed and anoxic state, which affects the activity of the sludge and may lead to errors in test results.

SUMMARY OF THE INVENTION

An object of the present disclosure is to provide an automatic measurement system for Sludge settling Velocity which can reduce test errors and improve detection timeliness.

An automatic measurement system for Sludge settling Velocity, comprising:
- a sampling and shooting module, which is configured to collect mud-water mixture samples and to obtain test images of the mud-water mixture samples;
- a measurement and analysis module, which is configured to acquire the test images and to acquire the sedimentation ratios of the mud-water mixture samples according to the test images; and
- a data service module, which is configured to store and manage the data of the test images and the Sludge settling Velocity.

In some examples, the measurement and analysis module is also configured to analyze sludge activity according to the Sludge settling Velocity of the mud-water mixed liquid samples during the sedimentation process, and then to judge whether the sludge activity is abnormal according to the result of the sludge activity analysis.

In some examples, the system also comprises a data processing module, which is configured to collect and store the process data during the operation of the sewage treatment process system;
the measurement and analysis module is also configured to obtain the process data of the mud-water mixture samples from the data processing module when the sludge activity is abnormal, and then to obtain the data of process analysis according to the process data and the results of sludge activity analysis.

In some examples, the system also comprises a human-computer interaction module, which is configured to receive the test instruction input by the user and send the test instruction to the sampling and shooting module, to receive the sedimentation ratio analysis instruction input by the user and send the sedimentation ratio analysis instruction to the measurement analysis module, and to receive the sludge activity analysis instruction input by the user and send the sludge activity analysis instruction to the measurement analysis module;

The data service module is also configured to store and manage the results of sludge activity analysis and the data of process analysis;

The human-computer interaction module is further configured to receive and display the Sludge settling Velocity, the results of sludge activity analysis and the data of process analysis.

In some examples, the human-computer interaction module is further configured to receive the query instructions input by the user, and then to obtain corresponding historical data from the data service module according to the query instructions;
- the human-computer interaction module is further configured to receive the report generation instructions input by the user, and to draw time-varying curves of the historical data according to the report generation instructions; the historical data includes the sedimentation ratios, the sludge activity analysis results, and the process analysis data of the mud-water mixed liquor samples collected by the sewage treatment process system at different times;
- the automatic measurement system is further configured to generate corresponding device operation data when the sampling and photographing module and the processing technology module operate abnormally, and to send the device operation data to the data service module;
- the human-computer interaction module is further configured to receive the abnormal query instructions input by the user, and to obtain corresponding device operation data from the data service module according to the abnormal query instructions, and then to generate and display statistical results of the device operation data.

In some examples, the sampling and shooting module comprises:
- a test container, which is configured to hold the mud-water mixture samples;

a lifting mechanism, which is configured to inject the mud-water mixture samples into the test containers;

a CCD camera, which is configured to obtain the test images of the mud-water mixture samples;

a flushing mechanism, which is configured to clean the test containers; and a PLC controller, which is configured to control the operation of the lifting mechanism and the flushing mechanism.

In some non-limiting examples, the sampling and photographing module further comprises:

a valve which is connected to the lift mechanism and the flushing mechanism; and a light source which is configured to fill light on the CCD camera;

the PLC controller is also configured to control the opening or closing of the valve and the light source.

In some examples, the automatic measurement system further comprises a communication module which is connected with the data service module, the measurement and analysis module, the sampling and shooting module, and the data processing module; both the data service module and the measurement and analysis module are connected with both the sampling and photographing module and the data processing module through the communication module.

In some examples, the communication module comprises at least one of USB communication unit, Ethernet communication unit, RS232 communication unit, RS485 communication unit, WIFI wireless communication unit, 4G communication unit and 5G communication unit.

In some examples, the human-computer interaction module, the data service module and the measurement and analysis module are all located on the cloud platform or on the local platform.

In some examples, the human-computer interaction module is also configured to receive the automatic test plan input by the user, and to generate automatic test instruction according to the automatic test plan, the automatic test instruction includes the test time; and to send the automatic test instruction to the sampling and photographing module, the measurement and analysis module, the data processing module, and the data service module respectively during the test time;

the sampling and shooting module collects the mud-water mixture sample according to the automatic test instruction, acquires the test image of the mud-water mixture sample, and sends the test image to the measurement and analysis module;

the data processing module collects and stores the process data during the operation of the sewage treatment process system according to the automatic test instruction;

the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data;

the data service module stores the test image, the sedimentation ratio, the sludge activity analysis result, and the process analysis data according to the automatic test instruction.

The Beneficial Effects of the Present Disclosure are as Follows

The automatic measurement system for Sludge settling Velocity according to the present disclosure comprises a sampling and shooting module, a data service module and a measurement and analysis module. The sampling and photographing module is configured to collect mud-water mixture samples and to obtain test images of mud-water mixture samples. The measurement and analysis module is configured to obtain the test image and to obtain the Sludge settling Velocity of the mud-water mixture sample according to the test image. The automatic measurement system of the present disclosure can avoid the problem of experimental errors caused by manual measurement of the sedimentation sludge volume, improve the measurement accuracy of the value of Sludge settling Velocity, and improve the detection efficiency of the Sludge settling Velocity.

DETAILED DESCRIPTION OF THE INVENTION

The present description of the invention will be further described below with reference to the accompanying drawings and embodiments.

In the following description, for purposes of explanation and not limitation, specific details are set forth, such as specific system structures, interfaces, techniques, etc., to provide a thorough understanding of the present disclosure.

The terms "system" and "network" are often configured interchangeably. The term "and/or" is only an association relationship to describe associated objects. The term "and/or" indicates that three relationships can exist. For example, A and/or B can mean that A exists alone, A and B exist at the same time, and B exists alone. In addition, the character "/" generally indicates that the related objects are "or". And the "multiple" means two or more.

Figure 1:
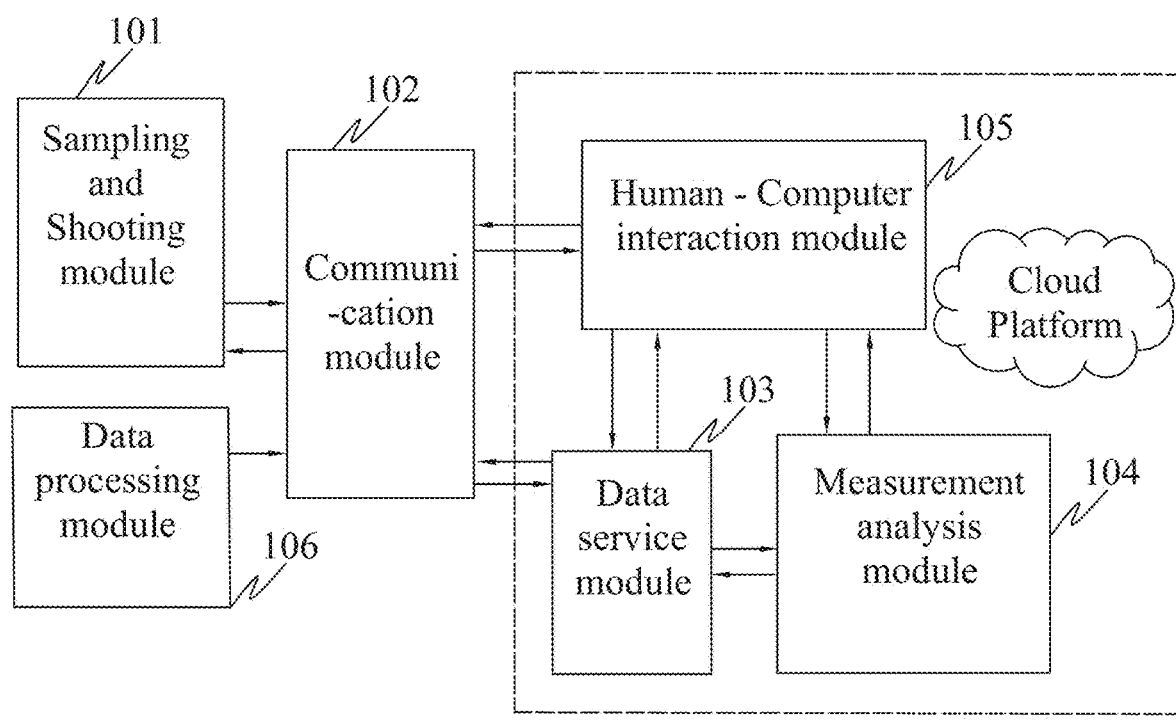
FIG. 1 shows a schematic structural diagram of an automatic measurement system for Sludge settling Velocity in accordance with an embodiment of the present disclosure.
Figure 2:
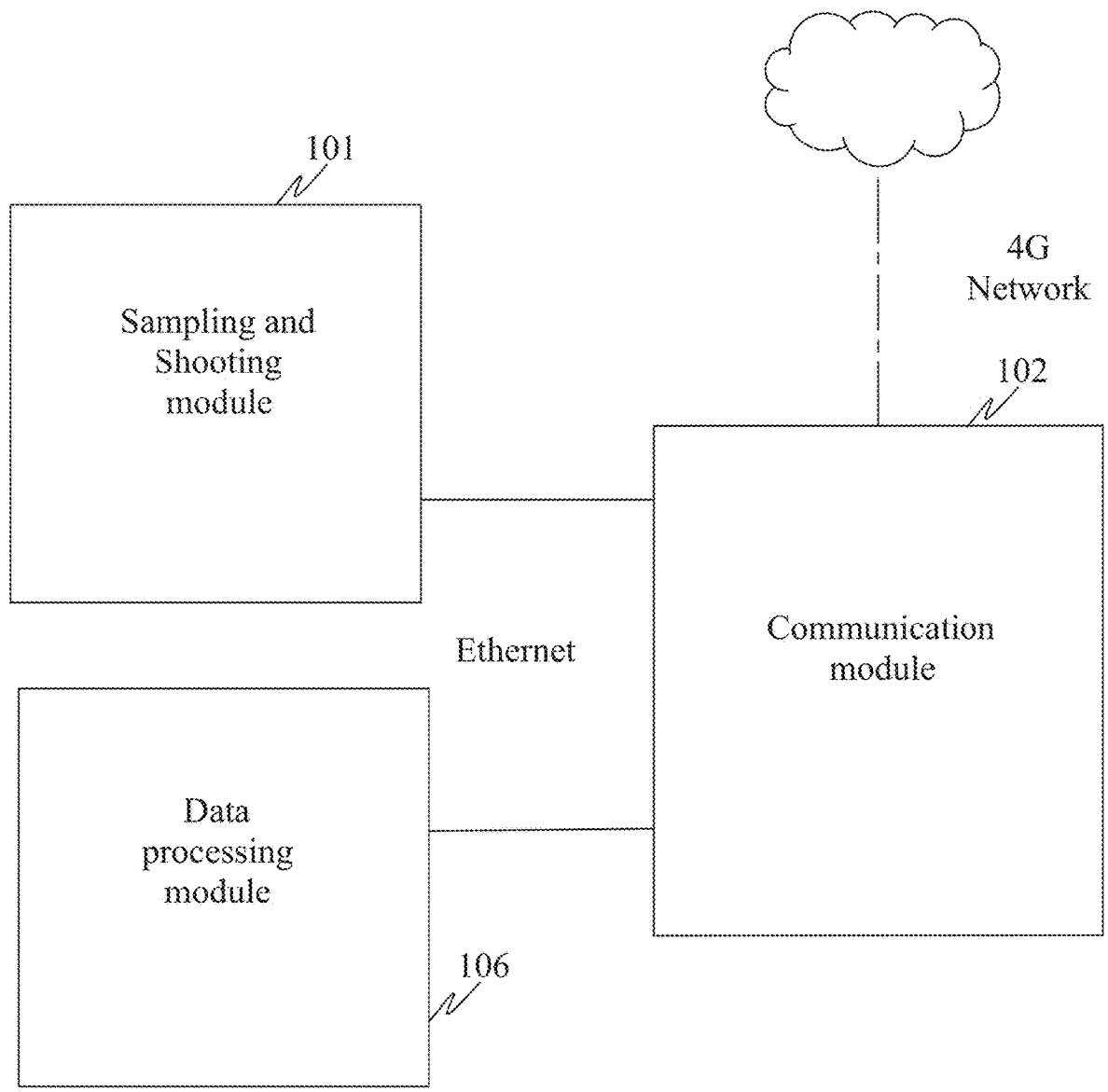
FIG. 2 shows a communication schematic diagram of an automatic measurement system for Sludge settling Velocity in accordance with an embodiment of the present disclosure.

The embodiment of the present disclosure provides an automatic measurement system for Sludge settling Velocity. As shown in FIG. 1 and FIG. 2, the automatic Sludge settling Velocity measurement system comprises a sampling and shooting module 101, a communication module 102, a data processing module 106, a data service module 103, a measurement analysis module 104 and a human-computer interaction module 105. The sampling and shooting module 101 communicates with the data service module 103, the measurement analysis module 104 and the human-computer interaction module 105 through the communication module 102 respectively. The data processing module 106 also communicates with the data service module 103, the measurement analysis module 104 and the human-computer interaction module 105 through the communication module 102, respectively.

The sampling and photographing module 101 is configured to collect mud-water mixed liquid samples and to obtain test images of the mud-water mixed liquid samples. The mud-water mixture samples are taken from the sewage treatment process system in the sewage treatment plant. For example, samples of mud-water mixtures are taken from aeration tanks.

Specifically, the sampling and photographing module 101 can perform images acquisition in the entire sedimentation process. In an alternative embodiment, the sampling and shooting module 101 can directly collect the videos of the entire sedimentation process of the mud-water mixture samples, and then select a plurality of videos frames at different time points from the videos as test images. In another alternative embodiment, the sampling and photographing module 101 can directly collect test images at different time points during the sedimentation process.

The measurement and analysis module 104 is configured to obtain the test images and to obtain the sedimentation ratios of the mud-water mixture samples according to the test images. Specifically, the measurement analysis module 104 performs images processing on the test images to obtain corresponding data, (for example, the data of the height of the settled sludge and the height of the sludge-water mixture in the test images.) and calculates the Sludge settling Velocity based on these data. Specifically, different test images correspond to the Sludge settling Velocity at different time points. The measurement and analysis module 104 is further configured to analyze the sludge activity according to the sedimentation ratios of the mud-water mixed liquid samples during the sedimentation process, to obtain the sludge activity analysis results; and then to judge whether the sludge activity is abnormal or not according to the sludge activity analysis results.

Of course, the data obtained by the image processing of the test image by the measurement analysis module 104 may include other data, such as the color of the sludge, in addition to the data configured to calculate the sedimentation ratios and to calculate the corresponding Sludge settling Velocity according to each test images. The measurement and analysis module 104 can also calculate other indicators according to the data of multiple test images. For example, the sedimentation velocity of sludge. The above technical solutions can be unquestionably derived from the contents of the present disclosure.

The data processing module 106 is configured to collect and store the process data during the operation of the sewage treatment process system. The data include temperature, pH or COD, etc. The measurement and analysis module 104 is further configured to obtain the process data of the mud-water mixture samples from the data processing module 106 when the sludge activity is abnormal, and then to obtain process analysis data according to the process data and the sludge activity analysis results.

The data service module 103 is configured to store and manage the data of the test images, the values of sludge sedimentation ratios, the results of sludge activity analysis and the data of process analysis.

The human-computer interaction module 105 is respectively connected with the data service module 103 and the measurement analysis module 104. The human-computer interaction module 105 is configured to receive the test instructions input by the user and to send the test instructions to the sampling shooting module 101, and to receive the values of Sludge settling Velocity analysis instructions input by the user and to send the instructions to the measurement analysis module 104, and to receive the sludge activity analysis instruction input by the user and to send the sludge activity analysis instructions to the measurement analysis module 104, and to receive and display the Sludge settling Velocity data, the sludge activity analysis results and the process analysis data.

In summary, the sampling and shooting module 101 receives the test instruction from the human-computer interaction module 105 to complete the value of Sludge settling Velocity test logically and stores the test process images into the data service module 103 through the communication module 102. The measurement and analysis module 104 receives the analysis instructions from the human-computer interaction module 105 and calls the test images stored in the data service module 103. And the measurement and analysis module 104 obtains the values of Sludge settling Velocity through the measurement of machine vision technology and pushes the results and images to the human-computer interaction module 105 for display and storage in the data service module 103. After the Sludge settling Velocity test completed, the measurement analysis module 104 receives the sludge activity analysis instructions of the human-computer interaction module 105 to analyze the value of Sludge settling Velocity test process, and the measurement analysis module 104 sends the results to the human-computer interaction module 105 to display and store them in the data service module 103. When the sludge activity is abnormal, the process data in the data processing module 106 are called for analysis, and the analysis results are sent to the human-computer interaction module 105 for display, and the analysis results are stored in the data service module 103.

The data service module 103, the measurement analysis module 104 and the human-computer interaction module 105 are all located on the cloud platform or on the local platform.

As shown in FIG. 2, the sampling and shooting module 101 and the data processing module 106 perform data interaction with the data service module 103, the measurement analysis module 104 and the human-computer interaction module 105 through the communication module 102. According to the interface requirements of the sampling shooting module 101 and the data processing module 106, the communication network of the system of this embodiment can be configured with USB, Ethernet, RS232/485, WIFI wireless and 4G communication. The communication module 102 may include at least one of the USB communication units, the Ethernet communication unit, the RS232 communication unit, the RS485 communication unit, the WIFI wireless communication unit, the 4G communication unit or the 5G communication unit.

Figure 3:
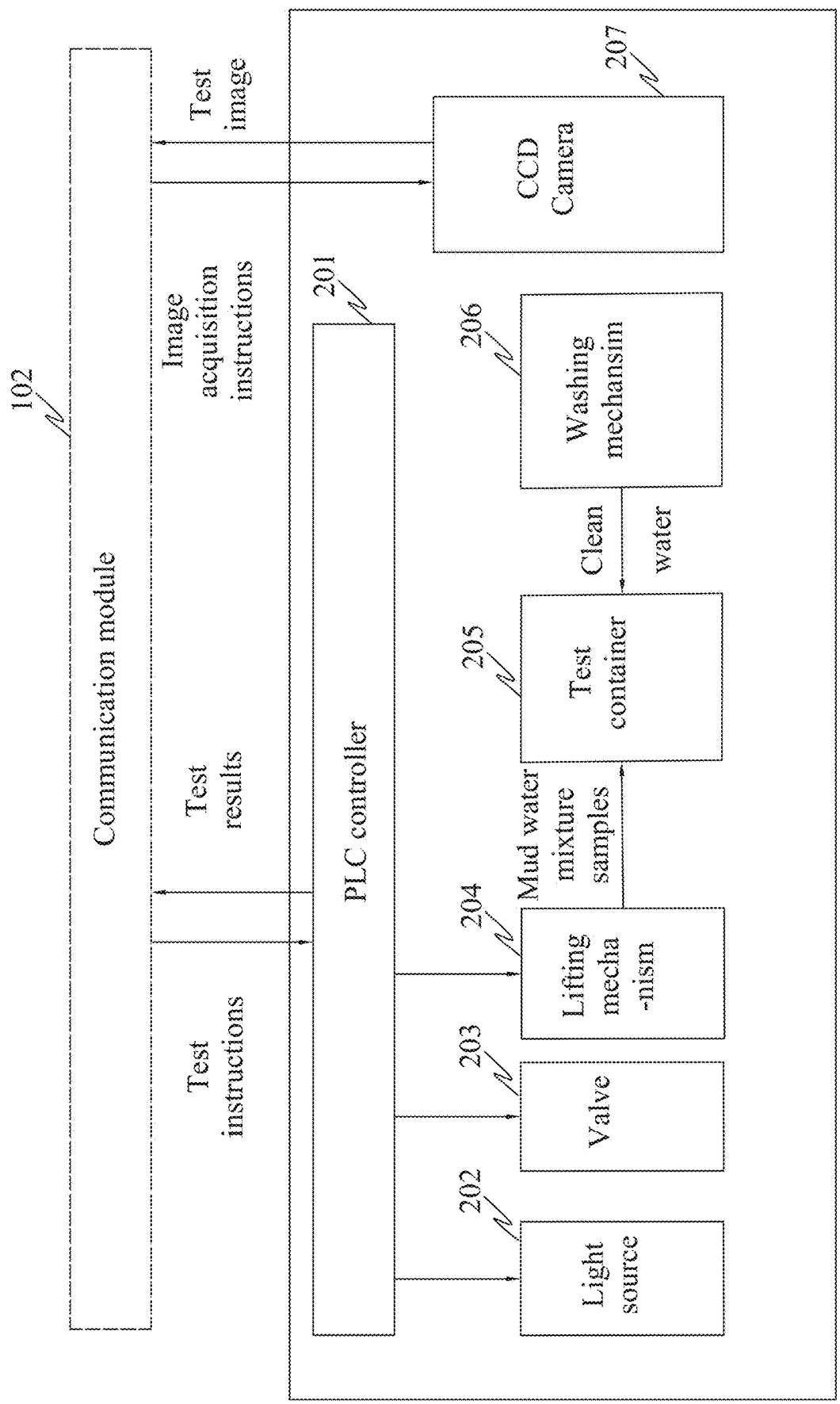
FIG. 3 is a schematic structural diagram of a sampling and shooting module in accordance with an embodiment of the present disclosure.

As shown in FIG. 3, in an alternative embodiment, the sampling and photographing module 101 further comprises a PLC controller 201, a light source 202, a valve 203, a lifting mechanism 204, a test container 205, a washing mechanism 206 and a CCD camera 207. The test container 205 is configured to hold the mud-water mixture samples. The lifting mechanism 204 is configured to inject the mud-water mixture samples into the test containers. The CCD camera 207 is configured to obtain the test images of the mud-water mixture samples. The flushing mechanism 206 is configured to clean the test containers. The valve 203 relates to with the elevator 204 and the flushing mechanism 206. The light source 202 is configured to supplement light to the CCD camera 207. The PLC controller 201 is configured to control the operation of the lifting mechanism 204 and the flushing mechanism 206 and to control the opening or closing of the valve 203 and the light source 202.

Specifically, the PLC controller 201 receives the Sludge settling Velocity measurement test instructions through the communication module 102, and controls the light source 202, the valve 203, the lifting mechanism 204 and the washing mechanism 206 to start and stop according to the test logic. And the PLC controller 201 feeds back the test results. The CCD camera 207 receives the image acquisition instructions through the communication module 102 to complete the acquisition of the test images and to upload the test images. When the CCD camera 206 captures the test process images of the test container 205, the light source 202 fills light for the CCD camera 206. The valve 203 cooperates with the lifting mechanism 204 to complete the sampling of the mud-water mixture to the test container 205. The valve 203 cooperates with the flushing mechanism 206 to complete the cleaning and flushing of the test container 205 with clean water.

The test logic comprises (1) Sampling, (2) Settling the sludge for 30 minutes, and collecting process images at the corresponding time node at the same time and calculating the value of the Sludge settling Velocity at the current node, (3) Discharge of mud-water mixture after the test is completed, (4) Flushing of the device.

Figure 4:
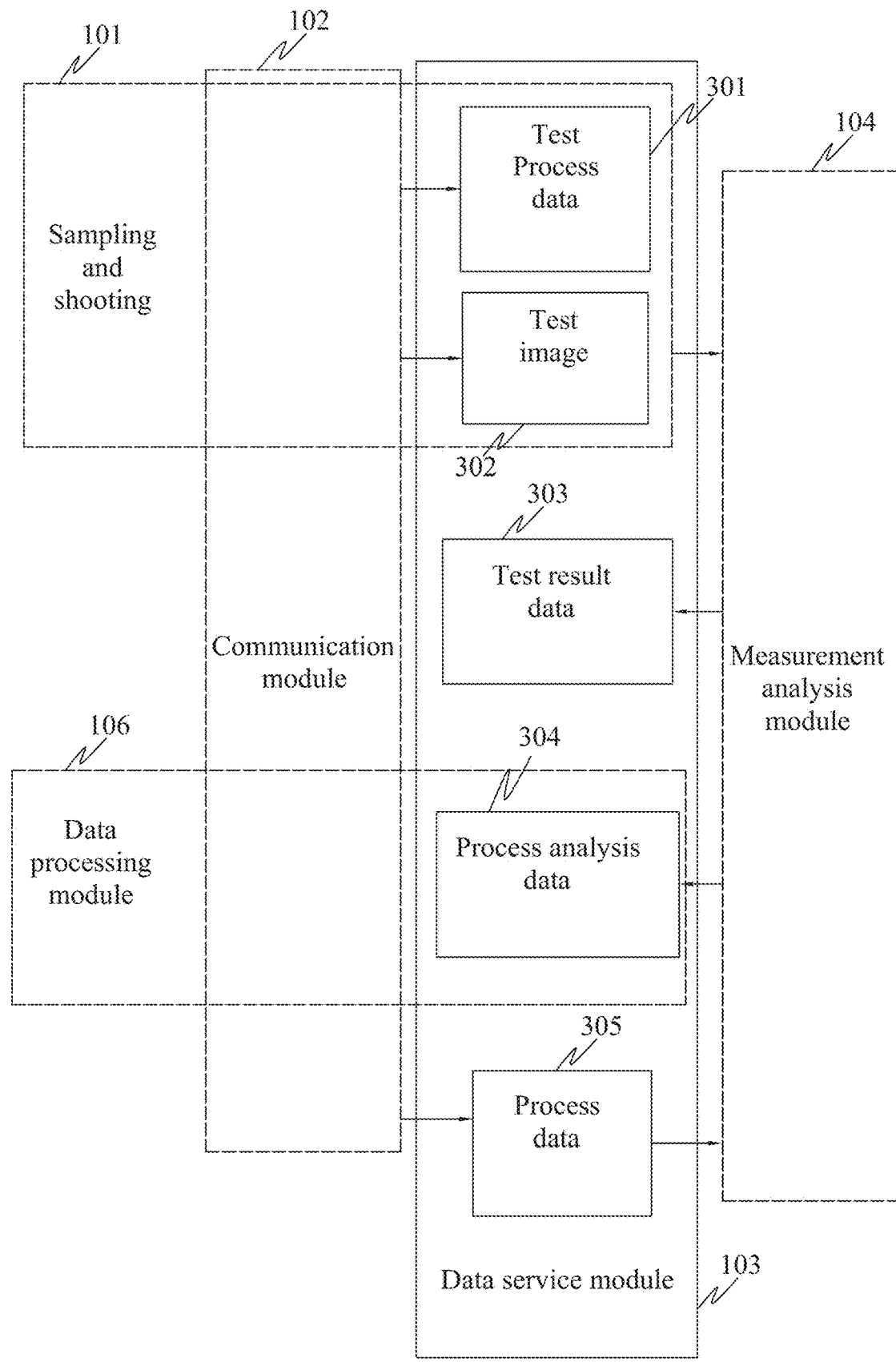
FIG. 4 is a schematic diagram of a data service module in accordance with an embodiment of the present disclosure.

As shown in FIG. 4, in the test process, the test process data 301 and the test images 302 are transmitted to the data service module 103 by the sampling and photographing module 101 through the communication module 102 for storage. The measurement and analysis system 104 calls the test images 302 in the data service module 103, and then applies the machine vision technology to measure and obtain the test result data 303 and store it in the data service module 103. The test result data 303 include the above-mentioned sedimentation ratios and sludge activity analysis results. When the measurement and analysis module 104 needs to call the operation process data 305 for analysis, the data processing module 106 transmits the required process data 305 to the data service module 103 through the communication module 102 for storage. And then the measurement analysis module 104 applies the process data 305 to analyze and stores the process analysis data 304 into the data service module 103.

The human-computer interaction module 105 is further configured to receive a query command input by the user and obtain corresponding historical data from the data service module 103 according to the query command. The human-computer interaction module 105 is also configured to receive the report generation instructions input by user, and to draw the time change curves of the historical data according to the report generation instructions. The historical data include the Sludge settling Velocity, the sludge activity analysis results, and the process analysis data of the mud-water mixed liquor samples at different collection times of the sewage treatment process system.

The measurement and analysis system 104 is also configured to generate corresponding device operation data when the sampling and photographing module 101 and the data processing module 106 operate abnormally and send the device operation data to the data service module 103. The human-computer interaction module 105 is further configured to receive the abnormal query instructions input by the user, to obtain corresponding device operation data from the data service module 103 according to the abnormal query instructions, and finally to generate and display the statistical result of the device operation data.

Figure 5:
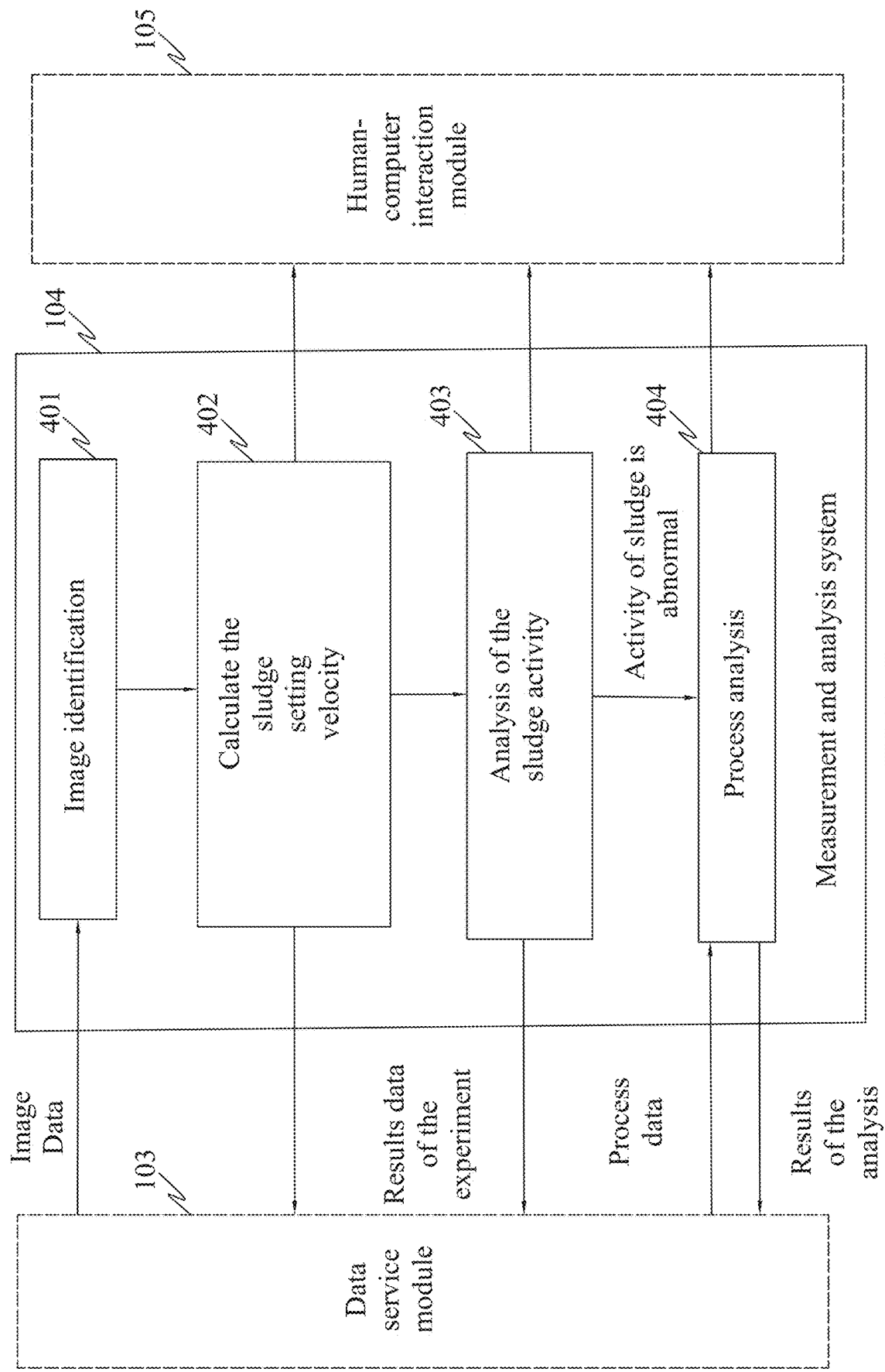
FIG. 5 is a schematic diagram of a measurement and analysis module in accordance with an embodiment of the present disclosure.

As shown in FIG. 5, the measurement and analysis of the automatic sludge settling velocity measurement system of the present disclosure are mainly completed by the data service module 103, the measurement analysis module 104 and the human-computer interaction module 105 in cooperation. The measurement and analysis module 104 calculates the values of the sludge settling velocity according to the data obtained from the data service module 103 and analyzes the sludge activity according to the settling ratio. When the sludge activity is abnormal, the measurement and analysis module 104 acquires process data from the treatment process module 106 and acquires process analysis data according to the process data and the sludge activity analysis result.

Specifically, the measurement and analysis module 104 obtains the image data of the sludge settling process from the data service module 103 to perform images recognition 401, and then calculates the sludge settling speed 402. The measurement and analysis module 104 sends the test result data of the sludge settling ratios to the data service module 103 for storage, and at the same time sends the test result data of the sludge settling ratios to the human-computer interaction module 105 for display.

Then the measurement and analysis module 104 performs sludge activity analysis tests based on the sludge sedimentation ratio values. And the measurement and analysis module 104 sends the test result data of the sludge activity analysis to the data service module 103 for storage and sends the test result data to the human-computer interaction module 105 for test result display. The measurement and analysis module 104 judges the sludge activity according to the test result data of the sludge activity analysis. If the sludge activity is abnormal, the measurement and analysis module 104 triggers the process analysis 404. The measurement analysis module 104 obtains process data from the data service module 103 for process analysis and feeds back the analysis results to the data service module 103 for storage, and simultaneously sends the analysis results to the human-computer interaction module 105 for display.

Figure 6:
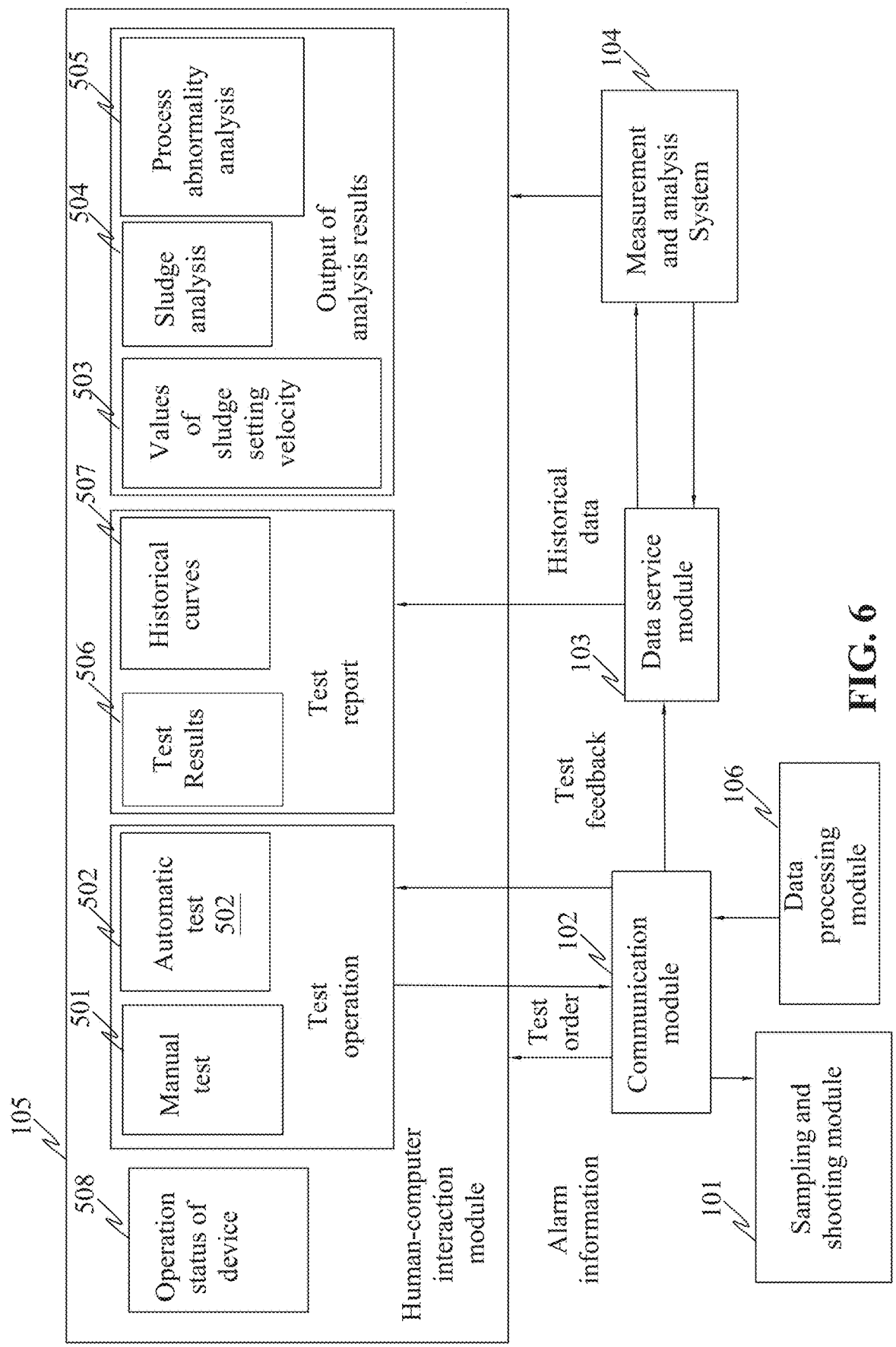
FIG. 6 is a schematic diagram of a human-computer interaction module in accordance with an embodiment of the present disclosure.

Specifically, as shown in FIG. 6, in the automatic measurement system disclosed in the embodiment, the test operations of sludge settling process include manual test 501 and automatic test 502. The manual test 501 can send test instructions at any time, and the automatic test 502 sends the test command regularly through the set test plan. The test instructions are sent to the sampling and shooting module 101 by the communication module 102, the sampling and photographing module 101 performs the values of Sludge settling Velocity test according to the test logic and feeds back the test status to the human-computer interaction module 105 in real time. During the test, the measurement analysis module 104 calculates the values of Sludge settling Velocity 503 at each measurement time point (5 min, 10 min, 20 min, 30 min). After the test, the measurement and analysis module 104 analyzes the sludge activity and sends the analysis results to the sludge analysis 504. When the mud property is abnormal, the measurement analysis module 104 analyzes the process and sends the results to the process abnormality analysis 505. The test results 506 can obtain historical test data from the data service module 103 according to the period and forms tables. The historical curve 507 can obtain historical test data from the data service module 103 according to the period and can draw the curve according to the measurement points (5 min, 10 min, 20 min, 30 min). When the device operates abnormally, the alarm information is sent to the operation status of device 508 for display and are stored in the data service module 103. Abnormal alarms can be eliminated by device operating condition 508. The operation status of device 508 can obtain historical alarm records from the data service module 103 according to the period. The human-computer interaction module 105 can count the abnormal operation times of the sampling and shooting module 101 and display it in the operation condition of device 508.

The above-described embodiments are merely embodiments of the present disclosure. For those skilled in the art, improvements can be made without departing from the concept of the present disclosure, but these improvements all belong to the protection scope of the present disclosure.

What is claimed is:

1. An automatic measurement system for Sludge settling Velocity, comprising:
   a sampling and shooting module, wherein the sampling and shooting module is configured to collect mud-water mixture samples and to obtain test images of the mud-water mixture samples, wherein the sampling and shooting module comprises:
      a test container configured to hold the mud-water mixture samples;
      a lifting mechanism configured to inject the mud-water mixture samples into the test containers:
      a CCD camera configured to obtain the test images of the mud-water mixture samples;
      a flushing mechanism configured to clean the test containers; and
      a PLC controller configured to control the operation of the lifting mechanism and the flushing mechanism;
   a measurement and analysis module configured to:
      acquire the test images and to acquire the sedimentation ratios of the mud-water mixture samples according to the test images;
      analyze sludge activity according to the Sludge settling Velocity of the mud-water mixed liquid samples during the sedimentation process, and then to judge whether the sludge activity is abnormal according to the result of the sludge activity analysis; and
      obtain the process data of the mud-water mixture samples from a data processing module when the sludge activity is abnormal, and then to obtain the data of process analysis according to the process data and the results of sludge activity analysis, wherein the data processing module is configured to collect and store the process data during the operation of the sewage treatment process system; and
   a data service module configured to store and manage the data of the test images and the Sludge settling Velocity.

2. The automatic measurement system of claim 1, wherein the system also comprises a human-computer interaction module, which is configured to receive the test instruction input by the user and send the test instruction to the sampling and shooting module, to receive the sedimentation ratio analysis instruction input by the user and send the sedimentation ratio analysis instruction to the measurement analysis module, and to receive the sludge activity analysis instruction input by the user and send the sludge activity analysis instruction to the measurement analysis module;
   the data service module is also configured to store and manage the results of sludge activity analysis and the data of process analysis; and
   the human-computer interaction module is further configured to receive and display the Sludge settling Velocity, the results of sludge activity analysis and the data of process analysis.

3. The automatic measurement system of claim 2, wherein the human-computer interaction module is further configured to receive the query instructions input by the user, and then to obtain corresponding historical data from the data service module according to the query instructions;
   the human-computer interaction module is further configured to receive the report generation instructions input by the user, and to draw time-varying curves of the historical data according to the report generation instructions; the historical data includes the sedimentation ratios, the sludge activity analysis results, and the process analysis data of the mud-water mixed liquor samples collected by the sewage treatment process system at different times;
   the automatic measurement system is further configured to generate corresponding device operation data when the sampling and shooting module and the processing technology module operate abnormally, and to send the device operation data to the data service module; and
   the human-computer interaction module is further configured to receive the abnormal query instructions input by the user, and to obtain corresponding device operation data from the data service module according to the abnormal query instructions, and then to generate and display statistical results of the device operation data.

4. The automatic measurement system of claim 3, wherein the human-computer interaction module is also configured to receive the automatic test plan input by the user, and to generate automatic test instruction according to the automatic test plan, the automatic test instruction includes the test time; and to send the automatic test instruction to the sampling and shooting module, the measurement and analysis module, the data processing module, and the data service module respectively during the test time;
   the sampling and shooting module collects the mud-water mixture sample according to the automatic test instruction, acquires the test image of the mud-water mixture sample, and sends the test image to the measurement and analysis module;
   the data processing module collects and stores the process data during the operation of the sewage treatment process system according to the automatic test instruction;
   the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data; and
   the data service module stores the test image, the sedimentation ratio, the sludge activity analysis result, and the process analysis data according to the automatic test instruction.

5. The automatic measurement system of claim 2, wherein the human-computer interaction module, the data service module and the measurement and analysis module are all located on the cloud platform or on the local platform.

6. The automatic measurement system of claim 2, wherein
the human-computer interaction module is also configured to receive the automatic test plan input by the user, and to generate automatic test instruction according to the automatic test plan, the automatic test instruction includes the test time; and to send the automatic test instruction to the sampling and shooting module, the measurement and analysis module, the data processing module, and the data service module respectively during the test time;

the sampling and shooting module collects the mud-water mixture sample according to the automatic test instruction, acquires the test image of the mud-water mixture sample, and sends the test image to the measurement and analysis module;

the data processing module collects and stores the process data during the operation of the sewage treatment process system according to the automatic test instruction;

the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data; and the data service module stores the test image, the sedimentation ratio, the sludge activity analysis result, and the process analysis data according to the automatic test instruction.

7. The automatic measurement system of claim 1, wherein the sampling and shooting module further comprises:
a valve which is connected to the lift mechanism and the flushing mechanism; and
a light source which is configured to fill light on the CCD camera wherein the PLC controller is also configured to control the opening or closing of the valve and the light source.

8. The automatic measurement system of claim 7, wherein
the human-computer interaction module is also configured to receive the automatic test plan input by the user, and to generate automatic test instruction according to the automatic test plan, the automatic test instruction includes the test time; and to send the automatic test instruction to the sampling and shooting module, the measurement and analysis module, the data processing module, and the data service module respectively during the test time;

the sampling and shooting module collects the mud-water mixture sample according to the automatic test instruction, acquires the test image of the mud-water mixture sample, and sends the test image to the measurement and analysis module;

the data processing module collects and stores the process data during the operation of the sewage treatment process system according to the automatic test instruction;

the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data; and the data service module stores the test image, the sedimentation ratio, the sludge activity analysis result, and the process analysis data according to the automatic test instruction.

9. The automatic measurement system of claim 1, wherein the automatic measurement system further comprises a communication module which is connected with the data service module, the measurement and analysis module, the sampling and shooting module, and the data processing module; both the data service module and the measurement and analysis module are connected with both the sampling and shooting module and the data processing module through the communication module.

10. The automatic measurement system of claim 9, wherein the communication module comprises at least one of USB communication unit, Ethernet communication unit, RS232 communication unit, RS485 communication unit, WIFI wireless communication unit, 4G communication unit and 5G communication unit.

11. The automatic measurement system of claim 9, wherein
the human-computer interaction module is also configured to receive the automatic test plan input by the user, and to generate automatic test instruction according to the automatic test plan, the automatic test instruction includes the test time; and to send the automatic test instruction to the sampling and shooting module, the measurement and analysis module, the data processing module, and the data service module respectively during the test time;

the sampling and shooting module collects the mud-water mixture sample according to the automatic test instruction, acquires the test image of the mud-water mixture sample, and sends the test image to the measurement and analysis module;

the data processing module collects and stores the process data during the operation of the sewage treatment process system according to the automatic test instruction;

the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data; and the data service module stores the test image, the sedimentation ratio, the sludge activity analysis result, and the process analysis data according to the automatic test instruction.

12. The automatic measurement system of claim 10, wherein
the human-computer interaction module is also configured to receive the automatic test plan input by the user, and to generate automatic test instruction according to the automatic test plan, the automatic test instruction includes the test time; and to send the automatic test instruction to the sampling and shooting module, the measurement and analysis module, the data processing module, and the data service module respectively during the test time;

the sampling and shooting module collects the mud-water mixture sample according to the automatic test instruction, acquires the test image of the mud-water mixture sample, and sends the test image to the measurement and analysis module;

the data processing module collects and stores the process data during the operation of the sewage treatment process system according to the automatic test instruction;

the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data; and the data service module stores the test image, the sedimentation ratio, the sludge activity analysis result, and the process analysis data according to the automatic test instruction.

13. The automatic measurement system of claim 1, wherein the human-computer interaction module is also configured to receive the automatic test plan input by the user, and to generate automatic test instruction according to the automatic test plan, the automatic test instruction includes the test time; and to send the automatic test instruction to the sampling and shooting module, the measurement and analysis module, the data processing module, and the data service module respectively during the test time;

the sampling and shooting module collects the mud-water mixture sample according to the automatic test instruction, acquires the test image of the mud-water mixture sample, and sends the test image to the measurement and analysis module;

the data processing module collects and stores the process data during the operation of the sewage treatment process system according to the automatic test instruction;

the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data; and the data service module stores the test image, the sedimentation ratio, the sludge activity analysis result, and the process analysis data according to the automatic test instruction.

14. The automatic measurement system of claim 1, wherein the human-computer interaction module is also configured to receive the automatic test plan input by the user, and to generate automatic test instruction according to the automatic test plan, the automatic test instruction includes the test time; and to send the automatic test instruction to the sampling and shooting module, the measurement and analysis module, the data processing module, and the data service module respectively during the test time;

the sampling and shooting module collects the mud-water mixture sample according to the automatic test instruction, acquires the test image of the mud-water mixture sample, and sends the test image to the measurement and analysis module;

the data processing module collects and stores the process data during the operation of the sewage treatment process system according to the automatic test instruction;

the measurement and analysis module acquires the sedimentation ratio of the test image according to the automatic test instruction, and analyzes the sludge activity according to the sedimentation ratio; when the sludge activity analysis result is abnormal, the measurement and analysis module acquires the process data from the data processing module, and obtains the process analysis data according to the sludge activity analysis result and the process data; and the data service module stores the test image, the sedimentation ratio, the sludge activity analysis result, and the process analysis data according to the automatic test instruction.

* * * * *